United States Patent [19]

Sinfelt et al.

[11] 3,901,827

[45] Aug. 26, 1975

[54] MULTIMETALLIC CATALYSTS

[75] Inventors: John H. Sinfelt, Berkeley Heights; James A. Cusumano, Rahway, both of N.J.

[73] Assignee: Exxon Research and Engineering Company, Linden, N.J.

[22] Filed: Sept. 27, 1972

[21] Appl. No.: 292,767

[52] U.S. Cl. ............ 252/455 R; 252/453; 252/454; 252/459; 252/460; 252/461; 252/466 B; 252/466 PT; 252/474; 252/476; 208/135; 208/137; 208/138; 208/139
[51] Int. Cl. ..... B01j 11/08; B01j 11/12; B01j 11/20
[58] Field of Search .......... 252/466 J, 466 PT, 474, 252/455 R, 476, 461

[56] References Cited
UNITED STATES PATENTS

| | | | |
|---|---|---|---|
| 2,837,424 | 6/1958 | Burford et al. | 252/474 |
| 2,852,570 | 9/1958 | Conradins et al. | 252/474 |
| 2,925,709 | 2/1960 | Mantell et al. | 252/474 |
| 3,156,735 | 11/1964 | Armstrong | 252/466 PT |
| 3,206,414 | 9/1965 | Gunther | 252/474 |
| 3,384,666 | 5/1968 | Lichtenwalter | 252/474 |
| 3,411,900 | 11/1968 | Roeder et al. | 75/173 C |
| 3,565,574 | 2/1971 | Kearby et al. | 252/474 |
| 3,567,625 | 3/1971 | Sinfelt et al. | 252/466 PT |
| 3,585,253 | 6/1971 | Huang | 252/466 PT |
| 3,718,578 | 2/1973 | Buss et al. | 252/466 PT |

FOREIGN PATENTS OR APPLICATIONS 1,780,364 Japan

OTHER PUBLICATIONS

Raub et al., Chem. Abstracts 61, 1964, Col. 10392.
Rudnitskii et al., Chem. Abstracts 56, 1962, Col. 12629.

*Primary Examiner*—Arthur P. Demers
*Attorney, Agent, or Firm*—R. J. Baran

[57] ABSTRACT

This invention relates to a process for preparing catalysts comprising two or more immiscible metals, said process comprising the step of incorporating an additional metal into said catalyst, said additional metal being characterized as being highly miscible with each of said immiscible metals whereby a catalyst is formed, wherein each metal is more miscible in the total metal mixture. In one preferred embodiment, this invention relates to a method for preparing multimetallic reforming catalysts wherein said metals are supported on a refractory oxide support. Catalysts prepared by the instant method are characterized as having increased stability due to the mutual miscibility of all the metals in the catalyst. In a specific embodiment, Group VIII – Group IB metal pairs having low miscibility, and which form useful bimetallic reforming catalysts because of the ability of Group IB metals to selectively inhibit the hydrogenolysis properties of Group VIII metals, are rendered more stable by the addition of a different Group VIII metal which acts to solubilize the first Group VIII metal and the Group IB metal in the total metal mixture. A specific improved catalyst results from the addition of nickel to a ruthenium-copper system; nickel acts to make the ruthenium and copper miscible in the total mixture. Similar results are found for Ru-Pt-Cu, platinum being the stabilizing Group VIII metal. Various catalysts prepared by the process of the instant invention are novel compositions of matter.

8 Claims, No Drawings

MULTIMETALLIC CATALYSTS

BACKGROUND OF THE INVENTION

1. Field of the Invention

This invention relates to a process for preparing catalysts comprising two or more immiscible metals, said process comprising the step of incorporating an additional metal into said catalyst, said additional metal being characterized as being highly miscible with each of said immiscible metals whereby a catalyst is formed, wherein each metal is more miscible in the total metal mixture. In one preferred embodiment, this invention relates to a method for preparing multimetallic reforming catalysts wherein said metals are supported on a refractory oxide support. Catalysts prepared by the instant method are characterized as having increased stability due to the mutual miscibility of all the metals in the catalyst. In a specific embodiment, Group VIII–Group IB metal pairs having low miscibility, and which form useful bimetallic reforming catalysts because of the ability of Group IB metals to selectively inhibit the hydrogenolysis properties of Group VIII metals, are rendered more stable by the addition of a different Group VIII metal which acts to solubilize the first Group VIII metal and the Group IB metal in the total metal mixture. A specific improved catalyst results from the addition of nickel to a ruthenium-copper system; nickel acts to make the ruthenium and copper more miscible in the total mixture. Similar results are found for Ru-Pt-Cu, platinum being the stabilizing Group VIII metal. Various catalysts prepared by the process of the instant invention are novel compositions of matter.

2. Description of the Prior Art

Platinum catalysts are well known for reforming naphthas. The reforming process, basically, involves the contacting of a naphtha feedstream, which may be either virgin, cracked, Fischer-Tropsch, or mixtures thereof, with a platinum-on-alumina catalyst, at elevated pressures and temperatures. The contacting takes place in the presence of hydrogen, which may be freshly added or a recycled by-product of the reforming reaction. The presence of hydrogen during the reforming reaction is essential to suppress the rapid deactivation of the platinum-on-alumina catalyst. Platinum-on-alumina catalysts are deactivated by the formation of carbon on the catalyst surface and the agglomeration of the platinum into large crystallites having lower activity.

A second generation of reforming catalysts has recently been developed. These catalysts utilize supported Group VIII noble metals such as iridium, rhodium, ruthenium, etc. Unfortunately, although these metals are very active for the reforming reactions, they usually give poorer liquid yields. It has been found that incorporation of a Group IB metal will control the hydrogenolysis activity of these active metals. The resultant bimetallic catalysts are active and selective; thus high quality reformate is obtained in excellent yields. In an analagous manner, other bimetallic catalysts have been developed which show decreased rates of deactivation through carbon formation. In these catalysts, a Group VIII metal which is very active for hydrogenolysis (e.g. iridium or rhodium, etc.) is combined with a less active catalyst metal such as platinum or palladium to give a bimetallic catalyst, which is much more resistant to carbon formation than platinum or palladium alone.

In many of the aforementioned bimetallic catalysts a new deactivation process has become apparent. For example, certain bimetallics of the Group VIII–Group IB type are known to form poorly miscible systems according to bulk thermodynamic metallurgical data. Admittedly, in a finely dispersed state on a refractory oxide support, miscibility may be possible in compositional ranges in which miscibility would be poor in the bulk. However, such systems will be unstable at conditions which promote sintering of the metal. More specifically, during use in a reforming process, high temperatures and/or exposure of the catalyst to reactive gases, e.g. oxygen and water, will cause agglomeration of the metal phase into larger crystallites, and thus, as predicted by the appropriate phase diagram, the metal phase will be unstable and tend to be converted to more than one phase.

SUMMARY OF THE INVENTION

It has now been unexpectedly found that a multimetallic catalyst comprising at least two immiscible metals may be substantially improved by incorporating an additional metal which has the characteristics of being highly miscible with each of said immiscible metals. In this manner, a homogeneous system is formed wherein each of the metals is miscible in the total metal mixture. This process is especially useful for preparing reforming catalysts comprising two or more metals having desirable properties in combination and yet subject to instability due to the immiscibility of the bulk metals.

The term immiscible as used in this application shall mean that the individual metals of the group of immiscible metals have mutual solubilities of less than 10 atom %, frequently less than 1 atom %, at room temperature and pressure. The additional metal, which is described as being highly miscible with each of said immiscible metals, shall be soluble in each to the extent of at least 40 atom %, preferably completely miscible in all proportions at room temperature and pressure.

An especially preferred class of multimetallic reforming catalysts comprises a mixture of a metal selected from Group VIII and a metal selected from Group IB of the Periodic Table of the Elements, on a refractory oxide support. For convenience, the Periodic Table of the Elements, as published in Day and Selbin's "Theoretical Inorganic Chemistry," p. 77, Reinhold, New York, 1962, will be used throughout the specification whenever the catalyst metals are identified by groups.

The various catalysts which are within the scope of the instant invention include Group VIII–Group IB metal pairs with low miscibility, e.g. combinations of iron with copper, silver or gold; cobalt with copper, silver or gold, rhodium with copper, silver or gold; iridium with copper, silver or gold; ruthenium with copper, silver or gold; nickel with silver or gold; platinum with silver; and osmium with copper, silver or gold. Some of these catalysts are especially interesting for use as reforming catalysts because of the Group IB metal's ability to modify the hydrogenolysis properties of the Group VIII metal. All of these above combinations, because of their limited miscibility, are subject to separation into separate metal phases under conditions promoting agglomeration. Each of these systems may be modified to alleviate this deficiency by the addition of a third metal which is characterized as being highly miscible with each of the first two metals. The third metal is preferably another Group VIII or Group IB metal which is miscible with the first Group VIII metal and the Group IB metal. However, this does not exclude the use of metals from Groups VIA and VIIA. The following table shows which Group VIII and Group IB metals may be utilized with the above-described immiscible Group VIII–Group IB metal combinations to improve miscibility.

TABLE 1

| Group VIII + Group IB Immiscible Metal Combinations | Ternary (Trimetallic) Systems |
|---|---|
| Fe—Cu | Fe—Ni—Cu, Fe—Pd—Cu, Fe—Pt—Cu |
| Fe—Au | Fe—Ni—Au, Fe—Pd—Au, Fe—Pt—Au |
| Fe—Ag | Fe—Pd—Ag |
| Co—Cu | Co—Ni—Cu, Co—Pd—Cu, Co—Pt—Cu |
| Co—Au | Co—Ni—Au, Co—Pd—Au, Co—Pt—Au |
| Co—Ag | Co—Pd—Ag |
| Ni—Ag | Ni—Pd—Ag, Ni—Au—Ag |
| Rh—Cu | Rh—Ni—Cu, Rh—Pd—Cu, Rh—Pt—Cu |
| Rh—Au | Rh—Ni—Au, Rh—Pd—Au, Rh—Pt—Au |
| Rh—Ag | Rh—Pd—Ag |
| Pt—Ag | Pt—Pd—Ag, Pt—Au—Ag |
| Ir—Cu | Ir—Pt—Cu, Ir—Ni—Cu |
| Ir—Au | Ir—Pt—Au, Ir—Ni—Au |
| Ru—Cu | Ru—Pt—Cu* |
| Ru—Au | Ru—Pt—Au* |

When preparing a catalyst by the process of the instant invention, a support is generally utilized which is preferably a porous adsorptive and refractory material, having a surface area determined by the Brunauer-Emmett-Teller (BET) method, of from 2 to 1000 m$^2$/g, and more preferably 100 to 300 m$^2$/g. Useful support materials include: (a) silicon-based materials such as silica, silica gel, silicon carbide, clays, natural and synthetic silicates such as kieselguhr, kaolin, china clay, etc.; (b) ceramic materials such as powdered porcelain and firebrick; (c) alumino-silicates and zeolitic materials such as naturally occurring or synthetic erionite, mordenite, faujasite, etc., that may or may not be previously converted to the hydrogen or ammonia form and reduced in soda content by virtue of an exchange with various metal cations, including rare-earth cations; (d) refractory inorganic oxides such as alumina, titania, zinc oxide, magnesia, thoria, chromia, silica-alumina, alumina-titania, silica-zirconia, alumina-chromia, etc; and (e) mixtures of one or more of the materials mentioned above. In general, refractory inorganic oxides are preferred. Typically the above-mentioned supports are commercially available for use as spheres, granules, powders, extrudates and pellets. Extrudates, if used, are preferably 1/16 to 1/4 of an inch in diameter.

In the catalysts prepared by the process of the instant invention, the atomic ratio of the Group VIII metal to the Group IB metal in the immiscible pair may vary from 99:1 to 1:99. Preferably said ratio will vary from 50:1 to 1:50, more preferably from 5:1 to 1:5. The atomic ratio of the additional metal, which may be selected from Groups IB, VIA, VIIA or VIII, preferably Group VIII, to the total immiscible metals, may vary from 1:50 to 1:1. Preferably the metals of the catalyst are supported and will comprise from 0.1 to 75%, more preferably from 0.1 to 10%, by weight of the total catalyst. In preparation of a reforming catalyst the support will comprise the major portion by weight of the catalyst. More preferably, the total supported metal content of said catalyst will comprise 0.05 to 5.0 weight percent, and preferably from 0.1 to 1.0 weight percent. In the preferred Group VIII–Group IB combinations prepared by the instant invention, the Group VIII metal which is immiscible with the Group IB metal will comprise 0.01 to 3.0 weight percent of the total catalyst, but more preferably 0.1 to 0.5 weight percent. All weights are based on dry catalyst. The Group IB metal will comprise 0.01 to 3.0 weight percent of the total catalyst, but preferably 0.05 to 0.5 weight percent. The additional metal which is utilized to improve the miscibility of the first two metals in the total metal mixture will comprise from 0.01 to 3.0 weight percent of the total catalyst, but preferably from 0.1 to 0.5 weight percent. This metal may be chosen from Table 1 for a specific immiscible metal combination. However, Group VIA and VIIA metals may also function similarly. The best results in reforming applications are obtained with alumina-containing compositions and, in particular, the gamma or eta forms are employed. Alumina is the preferred reforming catalyst support material.

Specific combinations, i.e., platinum-iridium-Group IB metals have been disclosed and claimed as useful in improved reforming processes in Ser. No. 292,719, filed in the names of Sinfelt, Carter, Barnett and Cusumano on the same day as this application. The subject matter of the two applications differs in that the instant application discloses a novel process for the preparation of novel multimetallic catalysts having improved stability to phase separation, and the other claims the use of specific trimetallic reforming catalysts.

Additional materials may be added to the catalyst to promote various hydrocarbon conversion reactions. For example, the naphtha reforming activity of a catalyst is improved by the addition of a halogen moiety, especially a chlorine or fluorine species, to the catalyst. The halogen is present in the catalyst in amounts varying from about 0.1 to about 3 weight percent, based on the total dry weight of catalyst. The halogens may be incorporated into the catalyst at a suitable stage in the catalyst manufacture, i.e., before, during, or after incorporation of the metal catalytic components onto the support material. Halogen is usually incorporated into the catalyst by impregnating the support with a halogen-containing metal compound, such as chloroplatinic acid. Additional halogen may be incorporated in the catalyst by contacting with materials such as hydrogen fluoride or hydrogen chloride, either during, prior to, or subsequent to the metal impregnation step. Halogen may also be incorporated by contacting the catalyst with a gaseous stream containing the halogen, which is usually chlorine. This may be done either prior to, during, or subsequent to its use under reaction conditions.

The reforming catalysts which are the preferred subjects of the instant invention may be prepared by impregnating the support with soluble salts of the above-described metals. Impregnation may be done simultaneously or sequentially, but preferably simultaneously to enhance the formation of well-dispersed multimetallic clusters which yield optimum catalytic activity and selectivity. Specifically, when utilizing the instant process for the preparation of the preferred reforming catalysts, the support material is impregnated with a solution of soluble salts of the three desired metals. Desirably, an aqueous solution of the metal compounds is used, although alcoholic and other media may be used in some cases. Preferably the metal salts are impregnated on the catalyst support simultaneously to maximize the desired interaction among the three metals and thus produce a highly stable and well dispersed metal phase. Typically, the support material is impregnated with an aqueous solution of decomposable compounds of the three metals in sufficient concentration to provide the desired quantity of metal in the finished catalyst. Typical compounds used are chloroiridic acid, iridium tribromide, ammonium chloroiridate, chloroplatinic acid, ammonium chloroplatinate, platinum or iridium amine salts, ruthenium trichloride, rhodium trichloride, palladium chloride, palladium amine salts, osmium trichloride, chloroosmic acid, auric chloride, chloroauric acid, silver nitrate, silver acetate, copper nitrate, copper chloride, copper acetate, nickel nitrate, nickel chloride, cobalt nitrate, cobalt acetate, iron nitrate, iron acetate and iron chloride. In a nonaqueous impregnation or deposition, organometallic compounds such as metal carbonyls, metal amines, metal phosphines or metal acetyl acetonates may be used. The preferred catalyst manufacturing technique involves contacting a previously prepared support, such as alumina, with an aqueous solution of the three metal compounds.

Following the impregnation of the support material with the three metal compounds, the composite catalyst material is dried at a temperature varying from about 220° to 250°F. The catalyst may be dried in air at the above-stated temperatures or may be dried by treating the catalyst in a flowing stream of inert gas or hydrogen. The drying step may be followed by an additional calcination step at a temperature of about 400°–800°F. However, care must be taken to avoid contacting certain trimetallic combinations with air or other gases of high oxygen concentration at temperatures in excess of 500°–800°F. Otherwise certain dispersed metals such as iridium, rhodium, ruthenium, etc. will oxidize and agglomerate to larger crystallites, with loss of surface area. Thus, it is preferable to reduce such catalysts directly in hydrogen, rather than subject them to an air calcination.

The performance of the reforming catalysts prepared by the present invention is affected by contacting with sulfur or sulfur-containing materials in the feed stock or from other sources. Accordingly, when the catalyst is employed for reforming hydrocarbons, the free and/or combined sulfur content of the catalysts should be maintained at a level less than about two atoms of sulfur, preferably less than one atom of sulfur, per atom of metal contained in the catalyst. The desired low catalyst sulfur levels are advantageously maintained during the predominant portion of any reforming cycle. Higher catalyst sulfur levels may be encountered during some portions of a naphtha reforming run such as in start-up or in the event of a process upset. Sulfur is removed from the catalyst by contacting the catalyst with sulfur-free feedstock. Finally, when used in hydrocarbon conversion processes such as hydrocracking, hydroisomerization, and especially reforming, the catalyst should be substantially free of alkali metal (Group IA) or alkaline earth metal (Group IIA) constituents (less than 0.1 wt. %), as the presence of basic components on the catalyst serves to inhibit certain reforming reactions. However, this does not limit the addition of such components when the multimetallic catalysts prepared by the instant invention are used in other areas such as hydrogenation, dehydrogenation, aromatization, oxidation or polymerization.

The catalysts prepared by the present invention have numerous uses. For example, the catalysts can be employed in the formation of aromatic compounds by contacting the catalyst with suitable paraffins or naphthenes at a temperature varying between about 600° and 1000°F and a pressure of less than about 10 atmospheres in the presence of hydrogen. The catalysts of this invention are also useful in catalyzing the isomerization of xylenes, or of ethylbenzene to xylenes, by contacting the reactants with the catalyst at a temperature varying from about 400° to 1000°F at elevated pressures in the presence of hydrogen. As mentioned above, the catalysts are also useful for catalyzing hydrogenation, hydrocracking, oxidation, polymerization, condensation and other reactions known to the art. However, the catalysts prepared by the instant invention are particularly useful in naphtha reforming processes.

When a catalyst useful for reforming is to be prepared by the process of the instant invention, preferably the immiscible Group VIII metal will be chosen from the group consisting of Pt, Ir, Rh, and Ru. More preferably, at least one of the immiscible Group VIII metals will be chosen from the Group consisting of Pt and Ir. The other immiscible metal will, of course, be selected from Group IB of the Periodic Table of the Elements. The most preferred reforming catalysts prepared by the process of the instant invention are Ir-Cu-Pt and Ir-Au-Pt.

In a naphtha reforming process, a substantially sulfur-free naphtha stream that typically contains about 20–80 volume % paraffins, 20–80 volume % naphthenes, and about 5 to 20% aromatics, and boiling at atmospheric pressure between 80° and 500°F, preferably between 150° and 450°F, is brought into contact with the catalyst in the presence of hydrogen. The reactions typically take place in the vapor phase at a temperature varying from about 650° to 1000°F, and preferably from about 750° to 980°F. Reaction zone pressures may vary from about 1 to 50 atmospheres, preferably from 5 to 25 atmospheres.

The naphtha feedstream is generally passed over the catalyst at space velocities varying from about 0.5 to 20 parts by weight of naphtha per hour per part by weight of catalyst (w/hr./w), preferably from about 1 to 10 w/hr./w. The hydrogen-to-hydrocarbon mole ratio within the reaction zone is maintained between about 0.5 and 20, preferably between 1 and 10. During the reforming process, the hydrogen employed can be in admixture with light gaseous hydrocarbons. Since the reforming process produces large quantities of hydrogen, a recycle stream is employed for admission of the hydrogen with the feed. Hydrogen is circulated at a rate of 0 to 15,000 standard cubic feet per barrel of naphtha, preferably from 1000–10,000 standard cubic feet per barrel.

In a typical operation, the catalyst is preferably maintained as a fixed bed within a series of adiabatically operated reactors. Specifically, the product stream from each reactor (except the last) in the reactor series is reheated prior to passage to the following reactor. Alternatively, the catalyst of the instant invention may be used in a moving bed in which the naphtha charge stock, hydrogen and catalyst are passed in parallel through the reactor, or in a fluidized system wherein the naphtha feedstock is passed in the gas phase upwardly through a turbulent bed of finely divided catalyst. Finally, if desired, the catalyst can be simply slurried with the charge stock and the resulting mixture conveyed to the reaction zone for further reaction.

Naphtha reforming involves several hydrocarbon conversion reactions which occur simultaneously. Specifically, the naphthene portion of the naphtha stream is very readily dehydrogenated to the corresponding aromatic compounds, the normal paraffins are isomerized to branched chain paraffins, paraffins are aromatized, and various aromatic compounds are isomerized to other aromatics. The highly boiling components in the naphtha stream are also hydrocracked to lower boiling compounds. Various trimetallic catalysts which are prepared by the process of the present invention have been found to be particularly effective for the dehydrocyclization of paraffins to aromatics. They do so with a minimum of hydrocracking to unwanted low molecular weight gaseous components such as methane or ethane. In the instant invention the presence of the Group IB metal inhibits hydrogenolysis but preserves dehydrocyclization. In addition there are several catalysts which indicate that the presence of the added Group VIII metal, whose function it is to stabilize the original Group VIII–Group IB binary, actually enhances the original Group VIII–Group IB interaction, and thus further intensifies the inhibition of hydrogenolysis. Thus, this particular catalyst class may be used very effectively in a second or final zone of a reformer to promote the conversion of paraffins to aromatics, after the naphthenes contained in the naphtha stream have been converted to aromatics with the use of a conventional reforming catalyst, such as platinum on alumina. However, because of its decreased hydrogenolysis activity, the catalyst may be utilized in either the initial or tail zones.

An outstanding feature of the above-described trimetallic reforming catalysts is their ability to maintain good catalytic activity and selectivity at commercially desirable levels for extended periods of time. This occurs for two reasons. First, the Group VIII–Group IB combination maintains high selectivity for the preferred dehydrocyclization reaction, and the added third metal may enhance the interaction responsible for this. The third metal also increases the stability of the metal phase and prevents its agglomeration.

In a typical commercial semiregenerative naphtha reforming process, reaction temperature is increased during the course of the run to maintain constant octane level. Raising the reaction temperature is necessary because the catalyst is usually deactivated as coke is laid down on the catalyst. Generally, the reaction temperature cannot be raised much beyond about 1000°F before rapid catalyst deactivation commences. Thus, as the reaction temperature approaches about 1000°F, it is necessary to regenerate or replace the catalyst. Typically, a regeneration operation consists of burning the coke deposits from the catalyst and thereafter treating the catalyst with chlorine, hydrogen chloride, organic chlorides or mixtures thereof in the presence or absence of oxygen or other materials such as steam, nitrogen, flue gas, etc. If after extended periods of time the reforming catalysts prepared by the process of the instant invention decline in activity to a point at which it is impractical for continued use, they may be regenerated as described above. In reforming technology it is known that during both process use and regeneration, the catalyst will be subjected to conditions which tend to convert the high surface area metal phase of the catalyst into agglomerates of lower surface area. When the metals of a multimetallic catalyst have limited miscibility, the agglomerates tend to be made up of essentially an inhomogeneous mixture of the constituent metals. That is, the catalyst metals separate into distinct phases. For example, a ruthenium-copper catalyst with high surface area and uniform dispersion, after a period of use, may be converted into a low surface area catalyst wherein said ruthenium and said copper exist in separate, large agglomerates. If the catalyst is prepared with an additional metal such as nickel, with which both ruthenium and copper are highly miscible, the catalyst is found to be more stable, with improved maintenance of surface area and decreased separation of the metals into individual agglomerates. Moreover, the addition of nickel at the levels needed does not substantially alter the catalyst properties; that is, an effective trimetallic catalyst is formed.

The following are specific embodiments of the instant invention.

The following experiments are to demonstrate the concept described above, and there is no intention to be so limited. In these experiments, a model reaction is carried out to demonstrate the usefulness of the invention described above in the reforming art.

In a reforming process, hydrogenolysis of compounds similar to ethane (the model compound) results in low liquid yields. Modification of the Group VIII metal's, e.g. ruthenium's propensity to catalyze hydrogenolysis reactions by combination with a Group IB metal, e.g. copper, is demonstrated. Contacting with helium at high temperatures results in an increase in the hydrogenolysis activity of this catalyst, thus demonstrating the incipient instability of the ruthenium-copper combination at conditions of use. When an additional Group VIII metal is incorporated along with the ruthenium and copper, e.g. nickel or platinum, the catalyst instability is greatly diminished.

EXAMPLE 1

A catalyst containing 5 wt. % ruthenium on silica was prepared by impregnating silica with an aqueous solution of $RuNO(NO_3)_3$. The solution contained 0.075 gm. of $RuNO(NO_3)_3$ per ml of solution. The amount of impregnating solution used was approximately 2.2 ml per gram of silica. The silica support had a surface area of approximately 300 m²/gm. After impregnation of the silica with the ruthenium salt, the resulting material was dried at 230°F.

EXAMPLE 2

A catalyst containing 6.16 wt. % ruthenium and 3.84 wt. % copper on silica was prepared by coimpregnating silica with an aqueous solution of the ruthenium trichloride and copper nitrate. The solution contained 0.064 gm of $RuCl_3$ and 0.057 gm of $Cu(NO_3)_2$ per ml of solution. The amount of impregnating solution used was approximately 2.2 ml per gram of silica. The silica support had a surface area of approximately 300 m²/gm. After impregnation of the silica with the active catalytic components, the resulting material was dried at 230°F.

EXAMPLE 3

A catalyst containing 4.54 wt. % ruthenium, 2.84 wt. % copper and 2.62 wt. % nickel on silica was prepared by co-impregnating silica with an aqueous solution of ruthenium trichloride, copper nitrate, and nickel nitrate. The solution contained 0.047 gm $RuCl_3$, 0.042 gm $Cu(NO_3)_2$, and 0.042 gm $Ni(NO_3)_2$ per ml of solution. The amount of impregnating solution used was 2.2 ml per gram of silica. Other preparative details are the same as those in Example 2.

EXAMPLE 4

A catalyst containing 2.82 wt. % ruthenium, 1.76 wt. % copper, and 5.42 wt. % platinum on silica was prepared by co-impregnating silica with an aqueous solution of chloroplatinic acid, ruthenium trichloride, and copper nitrate. The solution contained 0.058 gm $H_2PtCl_6$, 0.029 gm $RuCl_3$, and 0.026 gm $Cu(NO_3)_2$ per ml of solution. The amount of impregnating solution employed was 2.2 ml per gram of silica. Other preparative details are the same as those employed in Example 2.

EXAMPLE 5

The activities of the catalysts in Examples 1 and 2 were compared for the hydrogenolysis of ethane to methane at the following conditions: 540°F; ethane, hydrogen, and helium partial pressures of 0.030, 0.20, and 0.77 atm., respectively. The helium was employed as an inert diluent. Rates of ethane hydrogenolysis per gram of ruthenium in the catalyst are given below:

| Catalyst* | Rate, mole ethane converted/hr/gm Ru |
|---|---|
| 5% Ru | 18 |
| 6.16% Ru, 3.84% Cu | 0.0097 |

*Supported on silica; the catalysts were reduced in $H_2$ at 750°F prior to testing.

The inclusion of the copper with ruthenium decreases the hydrogenolysis activity by a factor of almost 2000.

EXAMPLE 6

The addition of copper to ruthenium was shown in Example 5 to suppress greatly the catalytic activity of ruthenium for hydrogenolysis of ethane to methane. If the dispersed ruthenium-copper catalyst of Example 2 is heated at elevated temperature to promote growth of the metal crystals, there is a driving force toward phase separation because of the limited miscibility of ruthenium and copper in the bulk. This in turn decreases the extent of interaction between the ruthenium and copper in the catalyst. This is reflected in an increase of hydrogenolysis activity after the catalyst is heated in helium at 1150°F for 4 hours. Data on ethane hydrogenolysis rates obtained at the same conditions employed in Example 5 are shown below:

| Catalyst | Rate mole/hr/gm Ru |
|---|---|
| 6.16% Ru, 3.84% Cu fresh | 0.0097 |
| 6.16% Ru, 3.84% Cu sintered in He | 0.051 |

EXAMPLE 7

The data in Example 6 showed that sintering of the Ru-Cu catalyst by heat treatment in helium at a temperature of 1150°F increased the activity of the catalyst for ethane hydrogenolysis, indicating a decreased interaction between ruthenium and copper. When platinum or nickel is incorporated in the catalyst, as in Examples 3 and 4, the resulting trimetallic catalyst is more stable during heat treatment. This is demonstrated by the following data showing that rates of ethane hydrogenolysis do not increase when the catalyst is heat treated at high temperature. Conditions of ethane hydrogenolysis are the same as those used in Examples 5 and 6.

| Catalyst | Rate, mole/hr/gm Ru |
|---|---|
| 4.54% Ru, 2.84 wt % Cu, 2.62 wt % Ni | |
| Fresh | 0.057 |
| Sintered in He at 1150°F | 0.060 |
| 2.82 wt % Ru, 1.76 wt. % Cu, 5.42 wt. % Pt | |
| Fresh | 0.41 |
| Sintered in $H_2$ at 1300°F | 0.31 |

What is claimed is:

1. A catalyst consisting essentially of, as metals, platinum and iridium in combination with a metal selected from the group consisting of copper and gold on a refractory support wherein the total content of the metals comprises from about 0.05 to 5 weight percent of the total catalyst and wherein the iridium comprises from 0.01 to 3 weight percent, platinum comprises from 0.01 to 3 weight percent, and copper or gold comprises from 0.01 to 3 weight percent of the total catalyst.

2. The catalyst of claim 1 wherein said refractory material is selected from the group consisting of silicon-based materials, ceramic materials, alumino-silicates, aluiminas, refractory inorganic oxides, and mixtures of one or more of the materials mentioned above.

3. The catalyst of claim 1 wherein said refractory material is alumina.

4. The catalyst of claim 3 further comprising from 0.01 to 3 weight percent halogen.

5. A catalyst consisting essentially of, as metals, copper and ruthenium in combination with a metal selected from the group consisting of platinum and nickel on a refractory support wherein the total content of the metals comprises from about 0.05 to 5 weight percent of the total catalyst and wherein the ruthenium comprises from 0.01 to 3 weight percent, copper comprises from 0.01 to 3 weight percent, and platinum or nickel comprises from 0.01 to 3 weight percent of the total catalyst.

6. The catalyst of claim 5 wherein said refractory material is selected from the group consisting of silicon-based materials, ceramic materials, alumino-silicates, aluminas, refractory inorganic oxides, and mixtures of one or more of the materials mentioned above.

7. The catalyst of claim 5 wherein said refractory material is alumina.

8. The catalyst of claim 7 further comprising from .1 to 3 weight percent halogen.

* * * * *